May 31, 1927.
E. A. DEWALD
1,630,257
VEHICLE DUMPING MECHANISM
Filed July 3, 1924   2 Sheets-Sheet 1
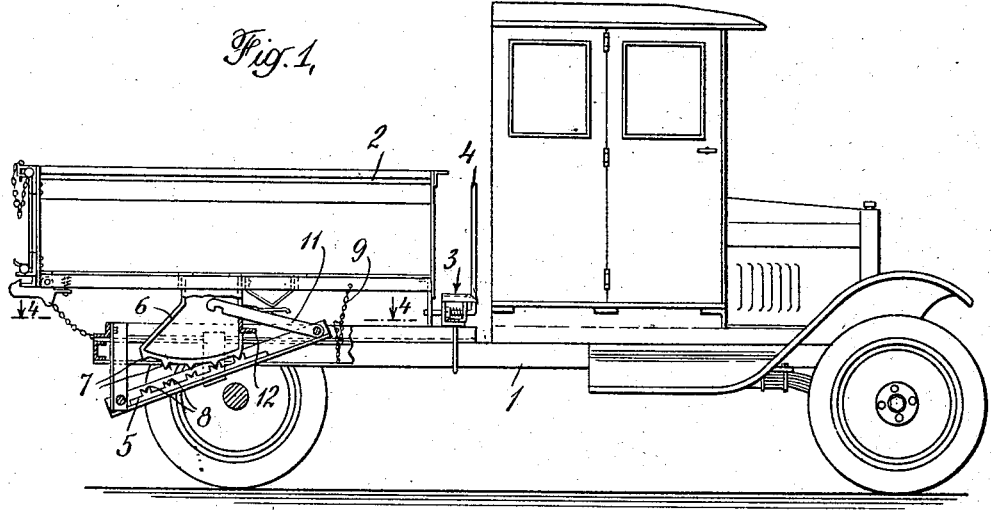
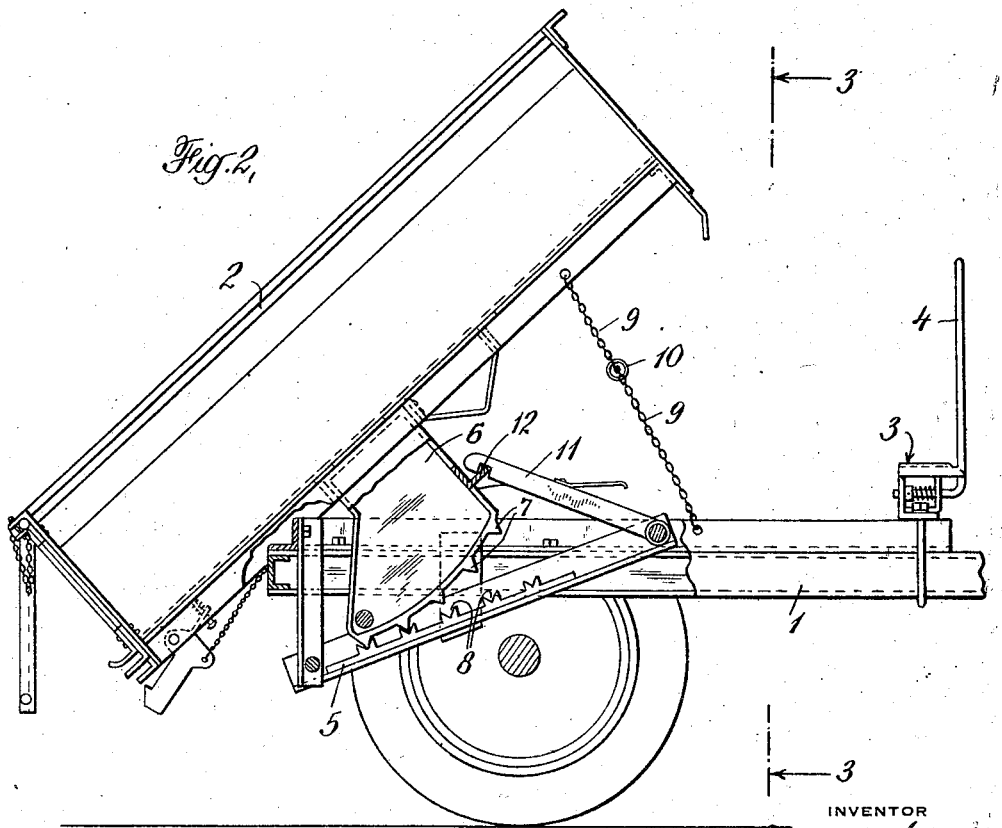
INVENTOR
Edward A. Dewald
BY
Pennie Davis Marvin & Edmonds
ATTORNEY May 31, 1927.  1,630,257
E. A. DEWALD
VEHICLE DUMPING MECHANISM
Filed July 3, 1924  2 Sheets-Sheet 2
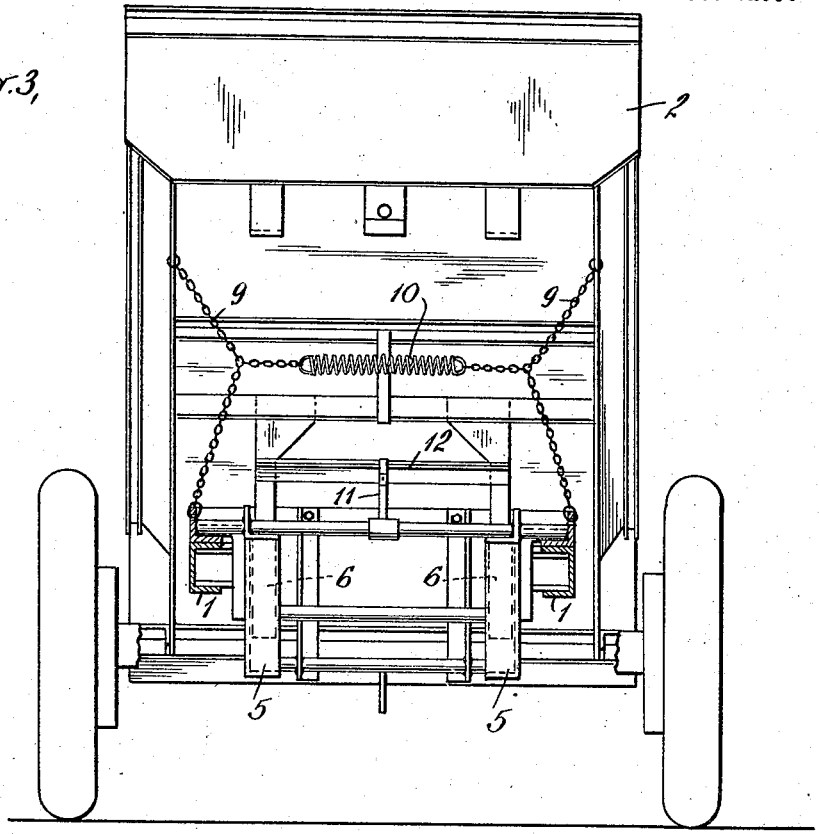
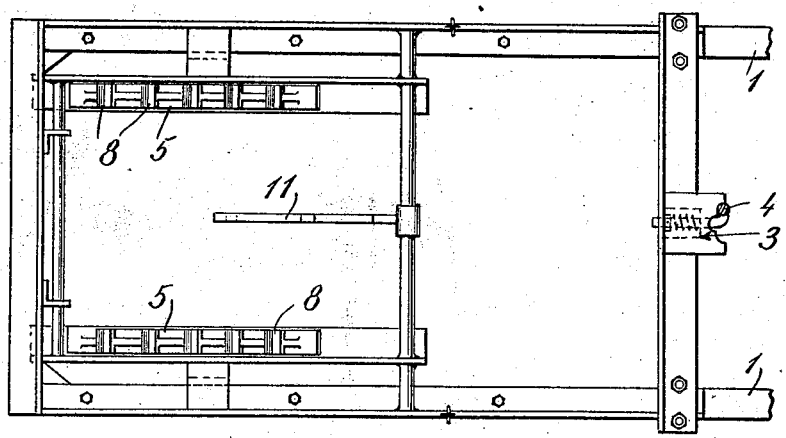
INVENTOR
Edward A. Dewald
BY
Pennie Davis Marvin & Edmonds
ATTORNEY Patented May 31, 1927.

1,630,257

UNITED STATES PATENT OFFICE.

EDWARD A. DEWALD, OF MASSILLON, OHIO, ASSIGNOR TO THE GRISCOM-RUSSELL COMPANY, OF NEW YORK, N. Y., A CORPORATION OF DELAWARE.

VEHICLE DUMPING MECHANISM.

Application filed July 3, 1924. Serial No. 723,914.

The present invention relates to vehicle dumping mechanism and has to do particularly with a mechanism of this type which is especially applicable to dump bodies pivoted at substantially the middle of their length and designed to be manually tilted into dumping position. The lighter motor trucks, say of about 1-ton capacity or less, are frequently provided with dump bodies which are actuated in this manner.

The dump body must necessarily be carried with the major portion of the body directly over the vehicle frame when the body is in its normal horizontal position. With this situation the degree of tilt which can be imparted to the body is usually limited by interference of the rear portion of the vehicle frame. In a manually operated dumping mechanism it is not feasible to provide means for elevating the entire dump body with its contents in order to discharge the load. It is therefore necessary in order to secure a sufficient degree of tilt for effecting satisfactory discharge of the load to normally mount the body at a considerable distance above the vehicle frame. This distance must be sufficient so that upon tilting the body a sufficient degree of tilt can be obtained before the bottom of the body strikes the rear portion of the vehicle frame and thus prevents further tilting movement.

The majority of standard vehicle frames to which bodies of this class are attached have frames which extend out a considerable distance beyond the rear axle of the vehicle and are also provided with a cross member at substantially the rear end of the frame which construction further increases the difficulty of providing for an adequate tilting movement of the body and requires that the body be normally mounted a relatively great distance above the frame. It is of course extremely desirable to provide a dump body and mechanism which can be applied to certain standard motor vehicle frames without necessity of making any substantial alterations in the construction of the frame.

The invention contemplates particularly a dumping mechanism such that the body readily attains an ample degree of tilt when in dumping position without interference with the frame or other portions of the vehicle and which at the same time rests a short distance above the vehicle frame when in its normal horizontal position. To accomplish these results the dump body is arranged to be moved bodily a considerable distance toward the rear of the vehicle into dumping position. By this means, a considerable portion of the body may be projected over the rear of the vehicle frame when in dumping position with the result that the body may be normally supported at a notably lesser distance above the vehicle frame and still be operative to provide an adequate degree of tilt when in dumping position. The invention also contemplates lowering of the body during its movement into dumping position to thus bring it into a more convenient position for discharge of the load.

The dump body is supported upon a suitable inclined track or tracks secured to the vehicle frame. The body is provided with supporting members which engage with the track and operate along it, thus producing the desired movement of the body. The supporting members secured to the body are preferably sectors projecting downwardly from the body and extending into rolling engagement with the supporting track, the centers of the sectors being disposed to the rear of the center of gravity of the body. In this way the sectors engage the track at progressively increasing distances from the center of gravity of the dump body so that the radius of curvature of the curve described by the center of gravity in moving from the normal position to the dumping position increases. The result of the mounting of the body in this manner is to give to it during the dumping operation a relatively large motion of translation toward the rear while it is being tilted. This carries the body well to the rear so that it clears the vehicle frame, and moveover, it reduces the amount of motion of rotation toward the end of the dumping movement which makes it easier to arrest the movement of the body and reduces the strain on the shock chains and springs.

The motion of the body during tilting preferably occurs in a series of pivotal steps. To attain this effect the track is provided with a succession of pivot sockets and the supports on the body are provided with a corresponding number of projections disposed successively farther from the center of gravity of the body and which pivotally engage the successive sockets on the track to thus provide the desired succession of pivotal movements. The tracks extend rearwardly and downwardly with respect to the vehicle frame to thus facilitate easy dumping of the body and at the same time to produce the desired tilting movement and positioning of the body for the dumping operation.

I have illustrated a preferred embodiment of my invention in the accompanying drawings in which Figure 1 is an elevational view with a part of the rear portion of the vehicle broken away, showing a motor vehicle provided with a dumping mechanism embodying my invention, the dump body being in its normal horizontal position; Figure 2 is a view showing the body in dumping position; Figure 3 is a transverse sectional view taken on line 3—3 of Figure 2; and Figure 4 is a plan view of the vehicle chassis illustrating a portion of the dumping mechanism.

Referring to the drawings, 1 indicates the frame of a vehicle here shown as a motor truck upon which the dump body 2 is supported. During transit the body 2 is carried in horizontal position and is supported substantially above the rear axle of the vehicle at about the middle of its length, as shown in Figure 1. A locking mechanism 3 is provided at the forward end of the dump body 2 for securing the body in horizontal position during transit. When it is desired to tilt the body 2 the lever 4 is shifted to one side or the other to thus release the locking mechanism 3, whereupon the body may readily be tilted by grasping it at its forward end and exerting an upward pull upon it. It will be noted that the body in its normal horizontal position is supported a relatively short distance above the vehicle frame 1, so that the vehicle when loaded is not top heavy and does not require a support of excessive height between the body and the frame.

When the body is tilted into dumping position, as shown in Figure 2, it is bodily moved a substantial distance toward the rear of the vehicle and at the same time is lowered at its rear end to a considerable distance below the vehicle frame. In this fashion, an adequate tilt to the body is obtained for dumping, yet it may be supported in normal position a relatively short distance above the vehicle frame.

The dump body is supported upon a pair of tracks 5 rigidly attached to the vehicle frame and extending rearwardly and downwardly with respect to the frame, as shown in Figure 3. Cooperating with the tracks 5 is a pair of supporting sectors 6 attached to the body 2 and serving to support the body in position upon the tracks. The sectors 6 are provided with a series of projections 7 spaced along the lower edge of the sectors and fitting respectively into the pivot sockets 8 provided along the tracks 5. When the body is in its normal horizontal position the forward pivot projections engage with the forward and uppermost pivot sockets 8 on the tracks, as shown in Figure 3. Upon tilting the body out of its horizontal position, the next succeeding pair of pivot projections comes into engagement with the next lower pair of pivot sockets on the tracks, and when the final dumping position is reached the body is supported by engagement of the rearmost projections with the rearmost and lowermost pivot sockets on the tracks.

The tilting movement of the body is thus accomplished in a succession of pivotal movements about pivot points successively lower, successively farther from the center of gravity of the body and successively farther toward the rear of the vehicle. By thus providing for the movement of the body in a succession of steps, the force of the shock of stopping the body when it has reached its ultimate position of tilt is lessened for the reason that the movement tending to produce rotation about each successive pivot point is less than that about the preceding point for the same position of the body. Thus at each step of the tilting movement of the body its movement is checked and it may be brought to rest in its ultimate position of tilt without undue strain upon the vehicle parts or the shock chains 9 and spring 10 provided to limit the stresses upon the vehicle parts. Moreover the combination of the rearwardly inclined tracks with the supporting sectors which coact with these tracks at successively increasing distances from the center of gravity of the body provides for a relatively great movement of the body toward the rear of the vehicle during the tilting operation. Hence the body can be normally supported during transit well forward over the vehicle frame, and yet can be dumped by hand so as to clear the rear portion of the frame-work of even vehicles which have chassis that extend for some distance to the rear of the rear axle.

An arm 11 is preferably provided on the frame 1 for engagement with a cross member 12 associated with the dump body. The arm 11 engages the member 12 in the fashion shown, thus locking the body in tilted position and avoiding premature return of the body to horizontal position in case a portion of the load should lodge in the upper end of the tilted body.

While I have illustrated a preferred embodiment of my invention, certain changes and modifications may be made within the scope of the appended claims.

I claim:

1. Vehicle dumping-mechanism of the class described, comprising a dump-body, a vehicle frame having a cross-bar located near the rear end of the dump-body and well to the rear of the vehicle axle, means on the vehicle frame for supporting said dump-body including steep downwardly and rearwardly sloping tracks, said tracks having thereon a plurality of pivot-sockets located a substantial distance below the vehicle frame, and feet on the dump-body extending a substantial distance below the body and provided with sectors for coacting with said tracks, said sectors having their front ends substantially the same vertical distance from the dump-body as their rear ends and having pivots on their peripheries for successively fitting into said pivot sockets.

2. Vehicle dumping-mechanism of the class described, comprising a dump-body, a vehicle frame having a cross-bar located near the rear end of the dump-body and considerably to the rear of the vehicle axle, means on the vehicle frame for supporting said dump-body including steep downwardly and rearwardly sloping tracks having racks thereon extending from a point substantially vertically above the rear axle of the vehicle to a point substantially vertically beneath the rearmost end of the vehicle frame, said racks comprising a series of pivot-sockets, the lowermost of said sockets being at a considerable distance below the rear axle of the vehicle and the uppermost being at a considerable distance below the frame of the vehicle, and feet integral with said dump-body having sectors thereon having their front ends the same distance from the dump-body as their rear ends, and having pivots on their peripheries engaging with said pivot sockets to support said dump-body at progressively increasing oblique distances from the center of gravity of said dump-body, at progressively increasing horizontal distances from the center of horizontal rest of the dump-body, and at progressively increasing vertical distances below the frame of the vehicle, whereby said dump-body is rearwardly translated, rotated counter-clockwise, and downwardly lowered into its dumping position in a path which clears considerably the rearmost point of the vehicle frame.

3. In a vehicle dumping-mechanism, in combination, a dump-body, a vehicle frame having a cross-bar located near the rear end of the dump-body and considerably to the rear of the vehicle, feet integral with said dump-body and having sectors the geometrical centers of which are located at a point considerably to the rear of the center of gravity of said dump-body and having their front ends and their rear ends at the same vertical distance from said dump-body, and steeply downwardly and backwardly sloping supporting tracks for said dump-body associated with said vehicle frame and having racks thereon coacting with said sectors, said racks having the uppermost center of support for said sectors at a point substantially directly above the rear axle of the vehicle, and the lowermost center of support at a point substantially directly beneath the rearmost cross-bar of the vehicle.

4. In a vehicle dumping-mechanism, in combination, a vehicle frame having a cross-bar located near the rear end of the dump-body and considerably to the rear of the vehicle axle, sectors integral with feet attached to said dump-body, said sectors having their geometrical centers located at a point considerably to the rear of the center of gravity of said dump-body, having their front ends and their rear-ends at the same vertical distance beneath the dump-body, and having a plurality of widely separated, equidistant pivot-points distributed over their peripheries, said pivot-points comprising teeth having a pitch considerably greater than their length, and steeply downwardly and backwardly sloping supporting tracks for said sectors and dump-body, said tracks having racks thereon comprising a plurality of separately-grouped pivot-socket members distributed at equal intervals thereon, the uppermost of said sockets being at a point substantially directly above the rear axle of the vehicle and the lowermost being at a point substantially directly beneath the rearmost frame cross-bar, each of said pivot-sockets comprising a pair of oppositely-facing teeth integral with the racks, and having their pitch considerably greater than their length.

In testimony whereof I affix my signature.

EDWARD A. DEWALD.